(12) United States Patent
Zhou et al.

(10) Patent No.: US 10,194,354 B1
(45) Date of Patent: Jan. 29, 2019

(54) AVAILABILITY BASED NETWORK SELECTION

(71) Applicant: Sprint Spectrum LP, Overland Park, KS (US)

(72) Inventors: Yu Zhou, Herndon, VA (US); Chunmei Liu, Great Falls, VA (US); Muhammad Naim, Sterling, VA (US); Pei Hou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 508 days.

(21) Appl. No.: 13/725,989

(22) Filed: Dec. 21, 2012

(51) Int. Cl.
*H04W 36/00* (2009.01)

(52) U.S. Cl.
CPC .................................. *H04W 36/00* (2013.01)

(58) Field of Classification Search
CPC . H04W 36/14; H04W 36/0016; H04W 36/22; H04W 36/30; H04W 36/0094

USPC .......................................... 455/436–444, 453
See application file for complete search history.

(56) References Cited

U.S. PATENT DOCUMENTS

| 2004/0090931 | A1* | 5/2004 | Proctor et al. | 370/328 |
| 2004/0203788 | A1* | 10/2004 | Fors et al. | 455/439 |
| 2009/0097451 | A1* | 4/2009 | Gogic | 370/331 |
| 2010/0216475 | A1* | 8/2010 | Hoole | 455/436 |
| 2011/0164593 | A1* | 7/2011 | Huet et al. | 370/333 |

\* cited by examiner

*Primary Examiner* — Joshua Schwartz

(57) ABSTRACT

A control element of a first wireless communication network, such as a mobility management entity, determines that a wireless device is being served by a second wireless communication network. The control element also receives an indicator associated with the availability of a base station in the first wireless communication network to serve the wireless device. Based on the indicator, the control element initiates a handover of the wireless device from the second wireless communication network to the first wireless communication network. The control element may also initiates a handover of the wireless device based on the indicator and based on a signal strength reported by the wireless device.

20 Claims, 7 Drawing Sheets

AVAILABILITY BASED NETWORK SELECTION

TECHNICAL BACKGROUND

From time-to-time, a wireless device such as a Smartphone may be served by networks that belong to a diversity of carriers. For example, the wireless device's primary carrier may not be available in the area where the wireless device is located. In this case, the primary carrier may have an agreement with a second carrier to allow the wireless device to "roam" in the second carrier's service area. In addition, a carrier may move a wireless device being served by its network, to that of a partner in order to reduce the load on the carrier's primary network.

A carrier may, however, have a preference for which network is used to serve the wireless device. This preference may change from time-to-time according to conditions in the networks available to serve the wireless device, the location of the wireless device, or other reasons. Accordingly, when a wireless device is being served by a network which is not preferred, the wireless device may need to be moved to the preferred network.

OVERVIEW

In an embodiment, a control element of a first wireless communication network determines that a wireless device is being served by a second wireless communication network. The control element also receives an indicator associated with the availability of a base station in the first wireless communication network to serve the wireless device. Based on the indicator, the control element initiates a handover of the wireless device from the second wireless communication network to the first wireless communication network.

In an embodiment, a communication system includes a control element of a first wireless communication network. The control element determines a wireless device is being served by a second wireless communication network. A base station of the first wireless communication network sends, to the control element, an indicator associated with an availability of the base station to serve the wireless device. In response to the indicator, the control element, initiates a handover of the wireless device from the second wireless communication network to the first wireless communication network.

In an embodiment, a control element of a first wireless communication network receives a first indicator associated with an availability of a first base station of the first wireless communication network to serve a wireless device. The control element receives, via a second base station of a second wireless communication network, a second indicator. The second indicator is associated with a signal strength of the first base station as measured by the wireless device. Based on these two indicators, the control element initiates a handover of the wireless device from the second wireless communication network to the first wireless communication network.

In an embodiment, a communication system includes a first base station in a first wireless communication network. This base station sends a first indicator associated with the availability of the first base station to serve a wireless device. A control element of the first wireless communication network receives this first indicator. The control element also receives, via a second base station of a second wireless communication network, a second indicator. The second indicator is associated with a signal strength of the first base station as measured by the wireless device. The control element, in response to these indicators, initiates a handover of the wireless device from the second wireless communication network to the first wireless communication network.

DETAILED DESCRIPTION

In an embodiment, a wireless device is being served by a low priority network. For example, the wireless device may have been moved to the low priority network when the home (e.g., high priority) network is unreachable. In another example, the wireless device may have been moved to the low priority network when the high priority network is overloaded. When the high priority network becomes available, the high priority network can cause the low priority network to handover the wireless device to the high priority network. In this manner, the wireless device can be moved from the low priority network to the high priority network based on conditions inside the high priority network of which the low priority network is unaware.

In an embodiment, the high priority network bases the decision to initiate the handover based on the load on an access node in the high priority network. In an embodiment, the load on the access node is sent to a control node (e.g., mobility management element—MME) by the access node. In an embodiment, the load on the access node can be sent to the control node using a control channel linking the access node and the control node. When the load is below a threshold, the control node can actively initiate the handover of the wireless device to the high priority network.

In an embodiment, when the control node initiates the handover, the control node can start a timer to measure a predetermined amount of time. When the wireless device is not experiencing radio conditions that are strong enough to complete the handover, the low priority network will not complete the handover and the predetermined amount of time will expire. Upon expiration of the predetermined amount of time, the control node can retry initiating the handover. After a predetermined number of tries, the high priority network can stop retrying to initiate handovers of the wireless device.

In another embodiment, the high priority network bases the decision to initiate the handover based on the load on an access node in the high priority network and a signal strength reported by the wireless device. In an embodiment, the load on the access node is sent to the control node by the access node. In an embodiment, the load on the access node can be sent to the control node using a control channel linking the access node and the control node. The signal strength report from the wireless device is sent to the control node via an access node in the low priority network. When the load is below a first threshold, and the signal strength reported by the wireless device is above a second threshold, the control node can actively initiate the handover of the wireless device to the high priority network.

Figure 1:
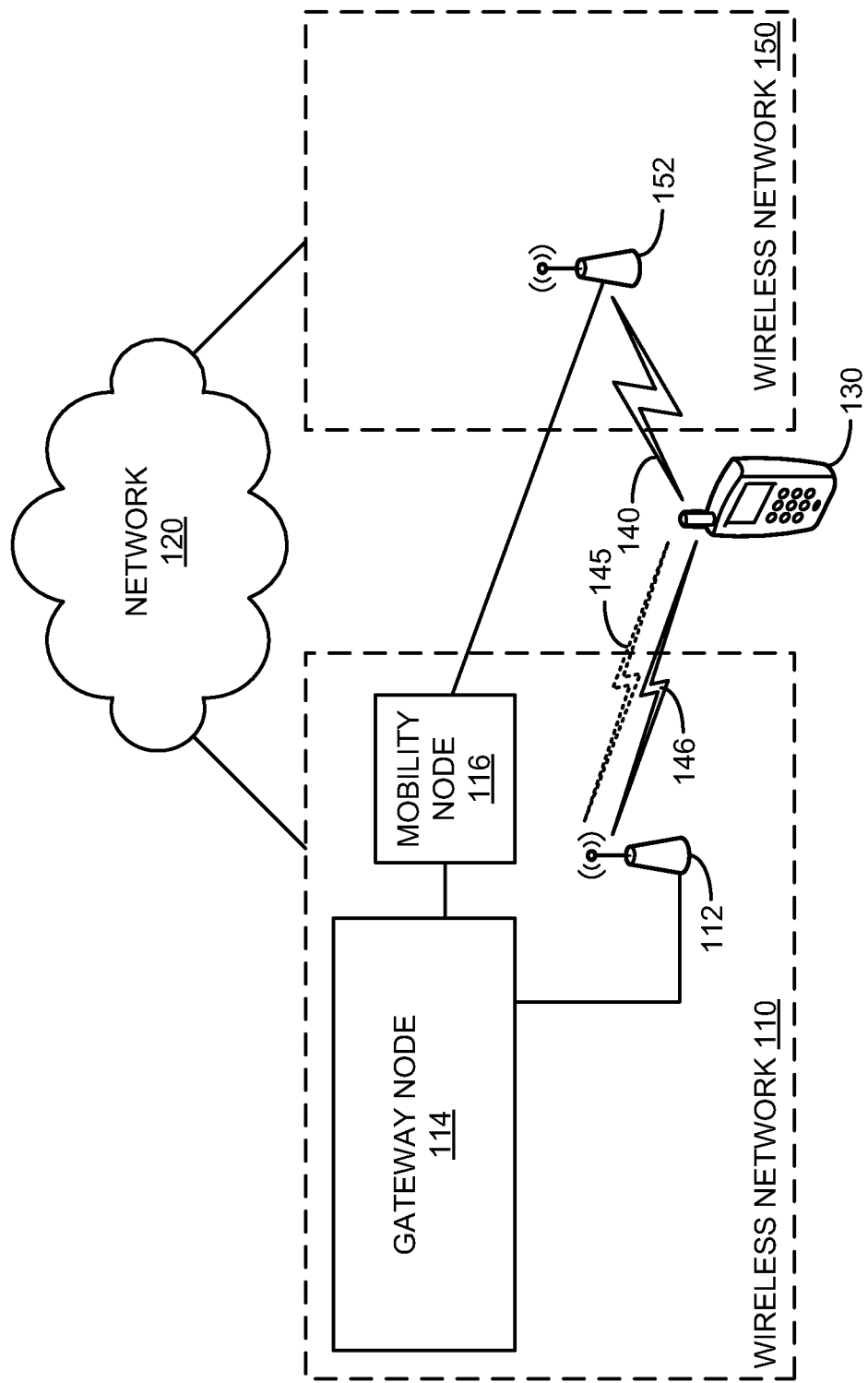
FIG. 1 is a block diagram illustrating an exemplary communication system.

Referring to FIG. 1, communication system 100 comprises wireless network 110, wireless link 140, wireless link 145, wireless link 146, network 120, wireless device 130, and wireless network 150. Wireless network 110 includes access node 112, gateway node 114, and mobility node 116. Wireless network 150 includes access node 152. Wireless network 110 is operatively coupled to network 120. Wireless network 150 is operatively coupled to network 120. Thus, wireless network 110 may be operatively coupled to wireless network 150 via network 120. In addition, wireless network 110 may be operatively coupled directly or indirectly to wireless network 150 without the use of network 120.

Wireless device 130 is operatively coupled to access node 152 via wireless link 140. Wireless device 130 may be operatively coupled to access node 112 via wireless link 145. Wireless device 130 may be operatively coupled to access node 112 via wireless link 146.

Mobility node 116 is operatively coupled to access node 152. Mobility node 116 may be operatively coupled to access node 152 via a control channel. Mobility node 116 may be operatively coupled to access node 152 via a control channel to send and receive control messages. These control messages may include parameters that mobility node 116 uses to determine that wireless network 150 is serving wireless device 130. These control messages may be used by mobility node 116 to instruct access node 152 to handover wireless device from wireless network 150 to wireless network 110 (and/or access node 112, in particular).

Access node 112 is a network node capable of providing wireless communication to wireless device 130. Access node 112 can be, for example, a base transceiver station, a radio base station, an eNodeB device, or an enhanced eNodeB device. Access node 112 communicates system information to wireless device 130 via wireless link 145. This system information may be communicated on a unicast (broadcast) paging channel.

Wireless device 130 may measure an indicator of signal strength associated with wireless link 145. Wireless device 130 may communicate this indicator of signal strength to access node 152 via wireless link 140. Wireless device 130 may measure and communicate the indicator of signal strength associated with wireless link 145 in response to a command from access node 152. This command from access node 152 may be sent to wireless device 130 in response to a handover request from network 110.

Wireless network 110 and wireless network 150 are communication networks that can provide wireless communication to wireless device 130. Network 120 is a communication network that can provide communication between wireless network 110 and wireless network 150. Wireless network 110, wireless network 150, and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 110, wireless network 150, and network 120 can also comprise wireless networks, including base station, wireless communication nodes, telephony switches, internet routers, network gateways, computer systems, communication links, or some other type of communication equipment, and combinations thereof.

Wired network protocols that may be utilized by wireless network 110, wireless network 150, and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 110, wireless network 150, and/or network 120 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between wireless network 110 and network 120, and between network 120 and wireless network 150, can be, for example, twisted pair cable, coaxial cable or fiber optic cable, or combinations thereof. Wireless link 140, wireless link 145, and/or wireless link 146 can be a radio frequency, microwave, infrared, or other similar signal. Wireless link 140, wireless link 145, and/or wireless link 146 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in wireless network 110, network 120, and wireless network 150, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between access node 112 and wireless network 110 which are omitted for clarity, including additional processing nodes, routers, gateways, and physical and/or wireless data links for carrying data among the various network elements. Likewise, other network elements may be present to facilitate communication between access node 152 and wireless network 150 which are also omitted for clarity, including additional processing nodes, routers, gateways, and physical and/or wireless data links for carrying data among the various network elements.

Wireless device 130 may be any device, system, combination of devices, or other such communication platform capable of communicating wirelessly with wireless network 110 and wireless network 150. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 110 via access node 112, and with wireless network 150 via access node 152. Other types of communication platforms are possible.

Wireless device 130 may establish a communication session with wireless network 110 in order to receive communication service. Wireless network 110 may be a home (or primary, preferred, or high priority) network to wireless device 130. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 130 may establish a communication session with wireless network 150 in order to receive communication service. Wireless network 150 may be a roaming (or non-preferred, or low priority) network to wireless device 130. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

In an embodiment, wireless device 130 is, at first, being served by wireless network 150 via wireless link 140. In other words, wireless link 140 is the primary communication path for wireless device 130 to receive communication service. Mobility node 116 repeatedly polls access node 112 for an indicator of the load on access node 112. In response, access node 112 sends an indicator of the load on access node 112 to mobility node 116 via a control channel. Once mobility node 116 receives an indicator of the load on access node 112 that is lower that a predetermined threshold (e.g., $Th_{load}$), and determines that wireless device 130 is being served by network 150 (instead of network 110), mobility node 116 instructs access node 152 to handover wireless device 130. Mobility node 116 can instruct access node 152 to handover wireless device 130 by sending a handover request to access node 152. Mobility node 116 can also start a timer to measure a predetermined amount of time.

In response to the instruction by mobility node 116 to handover wireless device 130, access node 152 instructs wireless device 130 to measure a signal strength associated with access node 112. This measurement can result in an indicator of a signal strength associated with access node 112. This indicator of signal strength associated with access node 112 can be derived from the signal strength of wireless link 145. Wireless device 130 sends the indicator of a signal strength associated with access node 112 to access node 152.

If the indicator of the signal strength associated with access node 112 shows a signal strength that is higher than a predetermined threshold (e.g., $Th_{signal}$), access node 152 completes the handover. If the indicator of the signal strength associated with access node 112 shows a signal strength that is lower than the predetermined threshold, access node 152 stops the handover. Because access node 152 has stopped the handover procedure, the handover instructed by mobility node 116 does not complete before the predetermined amount of time expires. When the predetermined amount of time has expired, mobility node 116 can retry instructing access node 152 to handover wireless device 130. After a predetermined number of retries, mobility node 116 can stop instructing access node 152 to handover wireless device 130.

Figure 2:
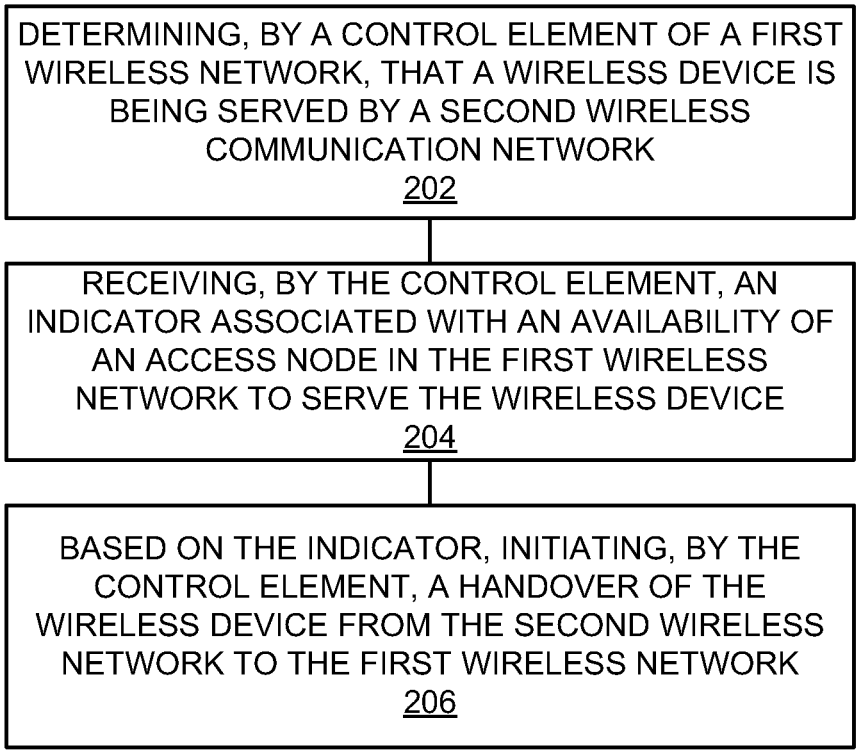
FIG. 2 is a flowchart illustrating an exemplary method of operating a communication system.

FIG. 2 is a flowchart illustrating an exemplary method of operating a communication system. The steps illustrated in FIG. 2 may be performed by one or more elements of communication system 100. A control element of a first wireless network determines that a wireless device is being served by a second wireless network (202). For example, mobility element 116 may determine that wireless device 130 is being served by wireless network 150 (and/or access node 152, in particular).

The control element receives an indicator associated with an availability of an access node in the first wireless network to serve the wireless device (204). For example, mobility node 116 may receive, from access node 112, an indicator associated with the load on access node 112. Mobility node 116 may repeatedly (or periodically) poll access node 112 for the load on access node 112. In response to being polled or otherwise queried, access node 112 may send the indicator its availability to serve wireless device 130 to mobility node 116. In another example, access node 112 may automatically (i.e., without being polled) send the indicator its availability to serve wireless device 130 to mobility node 116. Access node 112 may automatically (i.e., without being polled) send the indicator its availability to serve wireless device 130 to mobility node 116 at periodic intervals. Access node 112 may automatically (i.e., without being polled) send the indicator its availability to serve wireless device 130 to mobility node 116 when certain conditions occur—for example, when access node 112 has the capacity to serve additional wireless devices such as wireless device 130.

Based on the indicator, the control element initiates a handover of the wireless device from the second wireless network to the first wireless network (206). For example, based on the indicator from access node 112, mobility element 116 may send a handover request to access node 152. Mobility element 116 may send the handover request when the indicator of access node 112's availability to serve wireless device 130 meets a threshold requirement (e.g., access node 112's load is below a threshold, or its free capacity is above a threshold).

Figure 3:
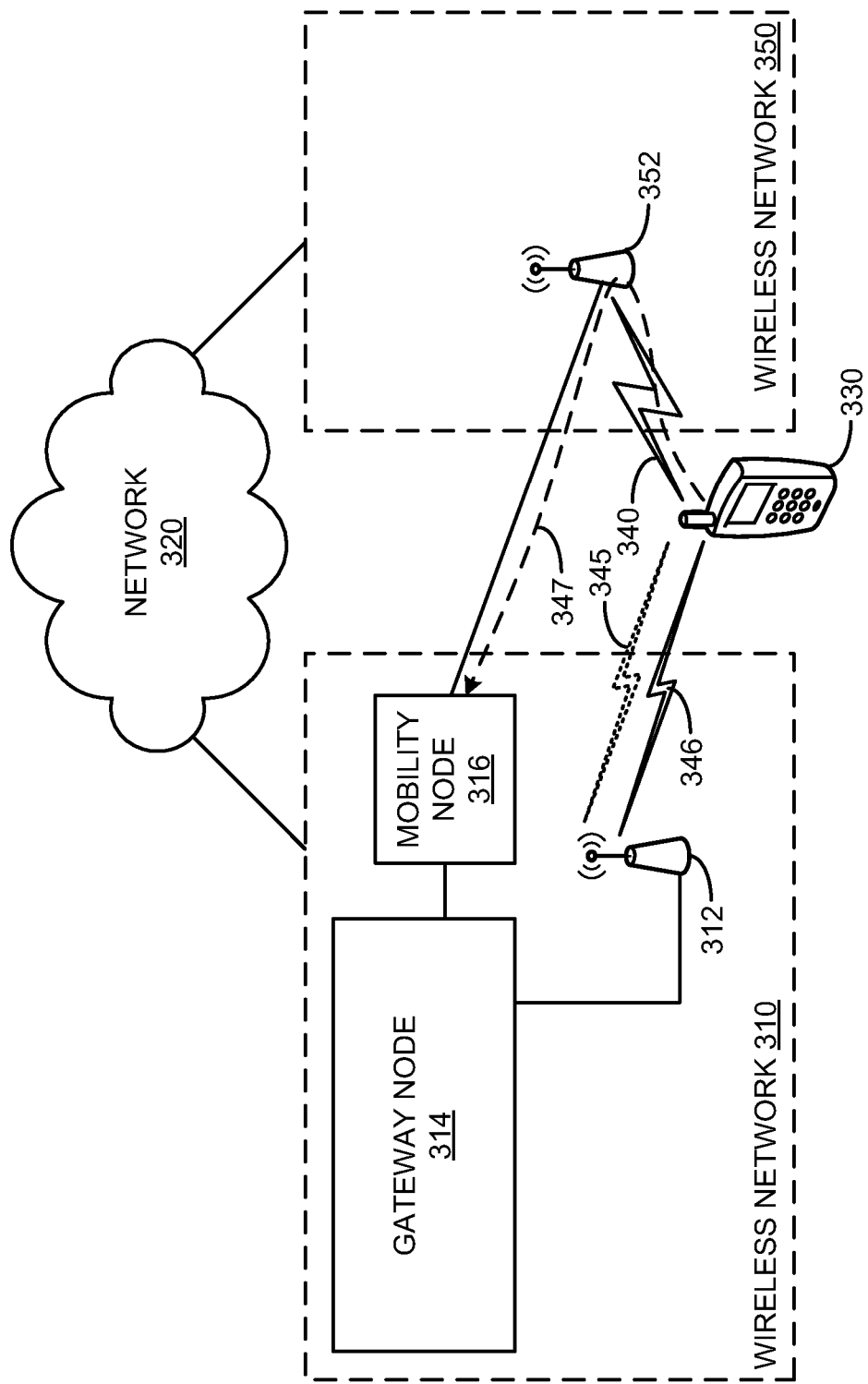
FIG. 3 is a block diagram illustrating another exemplary communication system.

Referring to FIG. 3, communication system 300 comprises wireless network 310, wireless link 340, wireless link 345, wireless link 346, control channel message 347, network 320, wireless device 330, and wireless network 350. Wireless network 310 includes access node 312, gateway node 314, and mobility node 316. Wireless network 350 includes access node 352. Wireless network 310 is operatively coupled to network 320. Wireless network 350 is operatively coupled to network 320. Thus, wireless network 310 may be operatively coupled to wireless network 350 via network 320. In addition, wireless network 310 may be operatively coupled directly or indirectly to wireless network 350 without the use of network 320.

Wireless device 330 is operatively coupled to access node 352 via wireless link 340. Wireless device 330 may be operatively coupled to access node 312 via wireless link 345. Wireless device 330 may be operatively coupled to access node 312 via wireless link 346.

Mobility node 316 is operatively coupled to access node 352. Mobility node 316 may be operatively coupled to access node 352 via a control channel. Mobility node 316 may be operatively coupled to access node 352 via a control channel to send and receive control messages. These control messages may include parameters that mobility node 316 uses to determine that wireless network 350 is serving wireless device 330. These control messages may be used by mobility node 316 to instruct access node 352 to handover wireless device from wireless network 350 to wireless network 310 (and/or access node 312, in particular). Control channel message 347 may be sent via a control channel. Control channel message 347 may include an indicator associated with a signal strength associated with access node 112 as measured by wireless device 130. Control channel message 347 may be sent to mobility node 316. Control channel message 347 may be sent to mobility node 316 in response to a request by mobility node 316.

Access node 312 is a network node capable of providing wireless communication to wireless device 330. Access node 312 can be, for example, a base transceiver station, a radio base station, an eNodeB device, or an enhanced eNodeB device. Access node 312 communicates system information to wireless device 330 via wireless link 345. This system information may be communicated on a unicast (broadcast) paging channel.

Wireless device 330 may measure an indicator of signal strength associated with wireless link 345. Wireless device 330 may communicate this indicator of signal strength to mobility node 316, via wireless link 340, using control channel message 347. Wireless device 330 may measure and communicate the indicator of signal strength associated with wireless link 345 in response to a command from mobility node 316. This command from mobility node 316 may be repeatedly sent to wireless device 330. Wireless device 330 may respond to the repeated commands from mobility node 316 by repeatedly sending indicators of signal strength that vary over time.

Wireless network 310 and wireless network 350 are communication networks that can provide wireless communication to wireless device 330. Network 320 is a communication network that can provide communication between wireless network 310 and wireless network 350. Wireless network 310, wireless network 350, and network 320 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 310, wireless network 350, and network 320 can also comprise wireless networks, including base station, wireless communication nodes, telephony switches, internet routers, network gateways, computer systems, communication links, or some other type of communication equipment, and combinations thereof.

Wired network protocols that may be utilized by wireless network 310, wireless network 350, and/or network 320 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 310, wireless network 350, and/or network 320 may comprise code division multiple access (CDMA) 3×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between wireless network 310 and network 320, and between network 320 and wireless network 350, can be, for example, twisted pair cable, coaxial cable or fiber optic cable, or combinations thereof. Wireless link 340, wireless link 345, and/or wireless link 346 can be a radio frequency, microwave, infrared, or other similar signal. Wireless link 340, wireless link 345, and/or wireless link 346 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 (and present in wireless network 310, network 320, and wireless network 350, in particular) to facilitate wireless communication to/from wireless device 330 but are omitted for clarity, such as base stations, base station controllers, gateways, mobile switching centers, dispatch application processors, and location registers such as a home location register or visitor location register. Furthermore, other network elements may be present to facilitate communication between access node 312 and wireless network 310 which are omitted for clarity, including additional processing nodes, routers, gateways, and physical and/or wireless data links for carrying data among the various network elements. Likewise, other network elements may be present to facilitate communication between access node 352 and wireless network 350 which are also omitted for clarity, including additional processing nodes, routers, gateways, and physical and/or wireless data links for carrying data among the various network elements.

Wireless device 330 may be any device, system, combination of devices, or other such communication platform capable of communicating wirelessly with wireless network 310 and wireless network 350. Wireless device 330 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 310 via access node 312, and with wireless network 350 via access node 352. Other types of communication platforms are possible.

Wireless device 330 may establish a communication session with wireless network 310 in order to receive communication service. Wireless network 310 may be a home (or primary, preferred, or high priority) network to wireless device 330. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 330 may establish a communication session with wireless network 350 in order to receive communication service. Wireless network 350 may be a roaming (or non-preferred, or low priority) network to wireless device 330. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

In an embodiment, wireless device 330 is, at first, being served by wireless network 350 via wireless link 340. In other words, wireless link 340 is the primary communication path for wireless device 330 to receive communication service. Mobility node 316 repeatedly polls access node 312 for an indicator of the load on access node 312. In response, access node 312 sends an indicator of the load on access node 312 to mobility node 316 via a control channel.

Mobility node 316 can repeatedly poll wireless device 330 for an indicator of a signal strength associated with access node 312. Wireless device 330 may measure the indicator of a signal strength associated with access node 312 in response to these repeated polls (or queries). The indicator of signal strength associated with access node 312 can be derived from the signal strength of wireless link 345. In response to at least one request by mobility node 316, wireless device 330 sends the indicator of signal strength associated with access node 312 to mobility node 316 via a control channel in control channel message 347. Wireless device 330 may measure the indicator of a signal strength associated with access node 312 during discontinuous reception cycles. Wireless device 330 may send the indicator of a signal strength associated with access node 312 to mobility node 316 in control channel message 347. Control channel message 347 can be sent, for example, via a direct LTE S1 interface connection between access node 352 and mobility node 316.

Once mobility node 316 detects that the indicator of the load on access node 312 is meets a first predetermined threshold (e.g., $Th_{load}$), and detects that the indicator of signal strength associated with access node 312 meets a second threshold (e.g., $Th_{signal}$), mobility node 316 instructs access node 352 to handover wireless device 330. For example, when mobility node 316 receives a load indicator that is lower than threshold $Th_{load}$, and receives, from wireless device 330, a signal strength associated with access node 312 that is greater than threshold $Th_{signal}$, mobility node 316 can instruct access node 352 to handover wireless device 330 by sending a handover request to access node 352.

Figure 4:
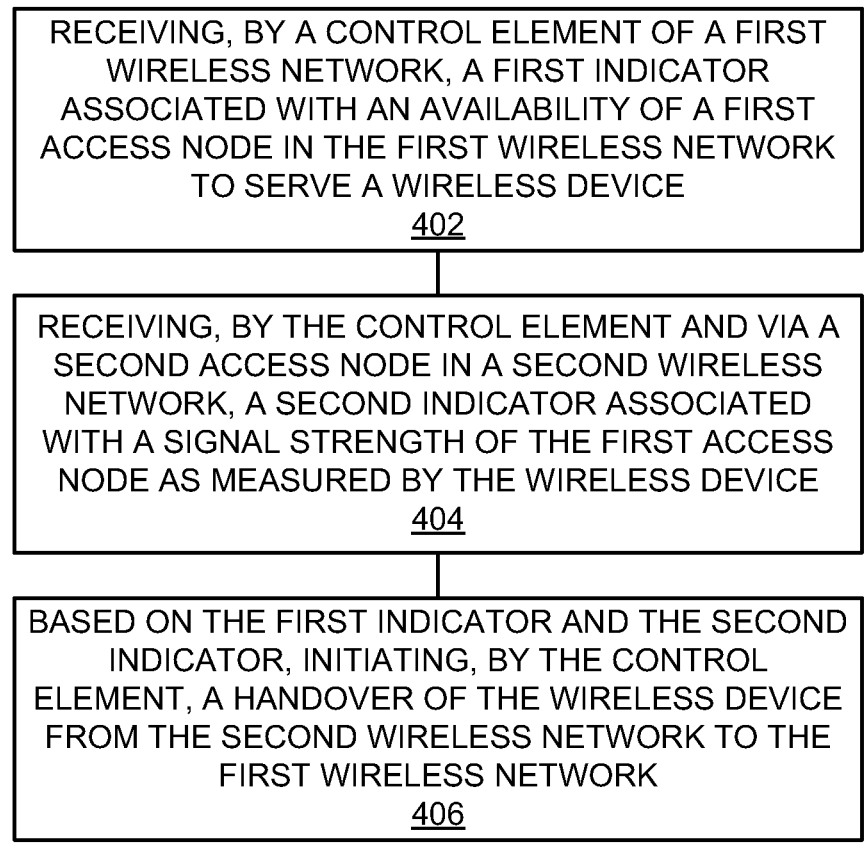
FIG. 4 is a flowchart illustrating another exemplary method of operating a communication system.

FIG. 4 is a flowchart illustrating an exemplary method of operating a communication system. The steps illustrated in FIG. 4 may be performed by one or more elements of communication system 300. The control element receives an indicator associated with an availability of an access node in the first wireless network to serve the wireless device (402). For example, mobility node 316 may receive, from access node 312, an indicator associated with the load on access node 312. Mobility node 316 may repeatedly (or periodically) poll access node 312 for the load on access node 312. In response to being polled or otherwise queried, access node 312 may send the indicator its availability to serve wireless device 330 to mobility node 316. In another example, access node 312 may automatically (i.e., without being polled) send the indicator its availability to serve wireless device 330 to mobility node 316. Access node 312 may automatically (i.e., without being polled) send the indicator its availability to serve wireless device 330 to mobility node 316 at periodic intervals. Access node 312 may automatically (i.e., without being polled) send the indicator its availability to serve wireless device 330 to mobility node 316 when certain conditions occur—for example, when access node 312 has the capacity to serve additional wireless devices such as wireless device 330.

The control element receives, via a second access node in a second wireless network, a second indicator associated with a signal strength of the first access node as measured by the wireless device (404). For example, mobility node 316 may receive in control channel message 347 an indicator of the signal strength of access node 312 as measured by wireless device 330. Control channel message 347 may be sent to mobility node 316 via access node 352.

Based on the first indicator and the second indicator, the control element initiates a handover of the wireless device from the second wireless network to the first wireless network (406). For example, based on a load indicator from access node 312, and a signal strength indicator from wireless device 330, mobility element 316 may send a handover request to access node 352. Mobility element 316 may send the handover request when the indicator of access node 312's availability to serve wireless device 330 meets a first threshold requirement (e.g., access node 312's load is below a threshold, or its free capacity is above a threshold) and when the indicator of the measured signal strength of access node 312 meets a second threshold requirement (e.g., the signal strength of access node 312, as measured by wireless device 330, is above a threshold).

Figure 5:
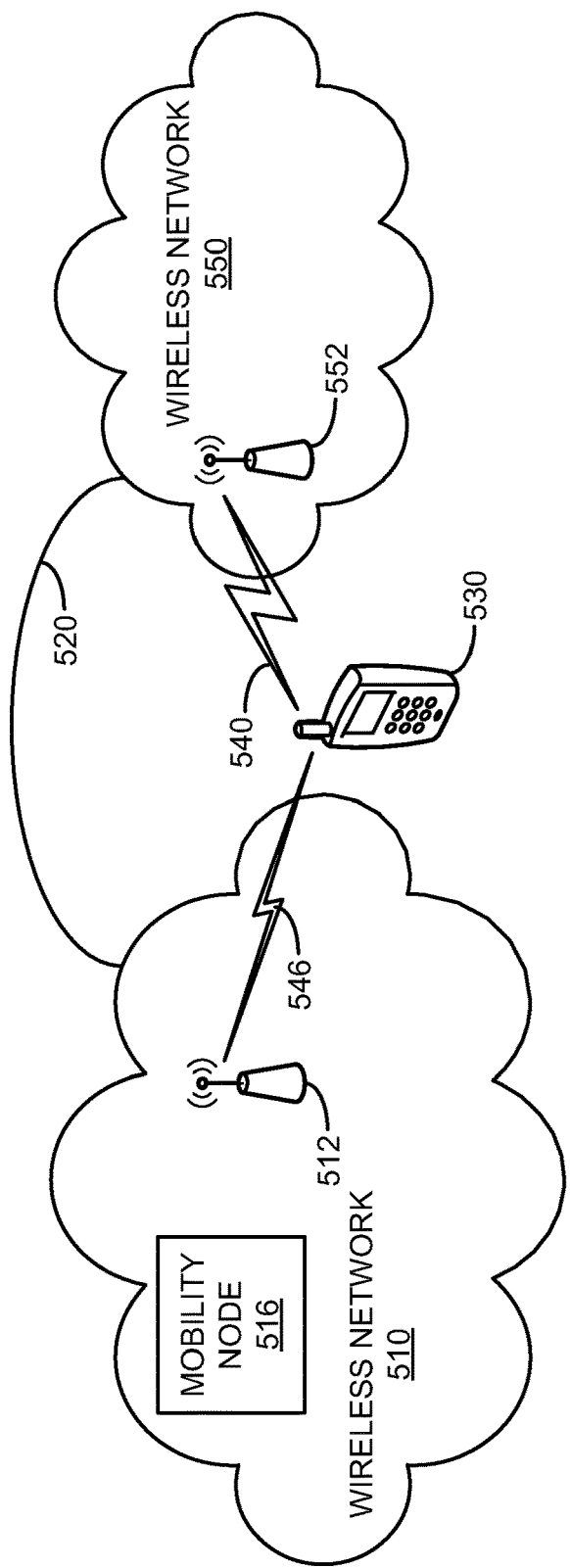
FIG. 5 is a block diagram illustrating a communication system.

FIG. 5 is a block diagram illustrating a communication system. In FIG. 5, communication system 500 comprises wireless network 510, wireless network 550, and wireless device 530. Wireless network 510 and wireless network 550 are operatively coupled by link 520. Wireless network 510 includes access node 512 and mobility node 516. Wireless network 550 includes access node 552.

Wireless network 510 and wireless network 550 are communication networks that can provide wireless communication to wireless device 530. Wireless network 510 and wireless network 550 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 510 and wireless network 550 can also comprise wireless networks, including base stations, wireless communication nodes, telephony switches, internet routers, network gateways, computer systems, communication links, or some other type of communication equipment, and combinations thereof.

Wired network protocols that may be utilized by wireless network 510 and wireless network 550 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 510 and wireless network 550 can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless link 540 and wireless link 546 can be radio frequency, microwave, infrared, or other similar signal. Wireless link 540 and/or wireless link 546 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 (and present in wireless network 510 and wireless network 550, in particular) to facilitate wireless communication to/from wireless device 530 but are omitted for clarity, such as base stations, base station controllers, gateways, mobile switching centers, dispatch application processors, and location registers such as a home location register or visitor location register. Furthermore, other network elements may be present to facilitate communication between access node 512 and wireless network 510 which are omitted for clarity, including additional processing nodes, routers, gateways, and physical and/or wireless data links for carrying data among the various network elements. Likewise, other network elements may be present to facilitate communication between access node 552 and wireless network 550 which are also omitted for clarity, including additional processing nodes, routers, gateways, and physical and/or wireless data links for carrying data among the various network elements.

Wireless device 530 may be any device, system, combination of devices, or other such communication platform capable of communicating wirelessly with wireless network 510 and wireless network 550. Wireless device 530 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 510 via access node 512, and with wireless network 550 via access node 552. Other types of communication platforms are possible.

Wireless device 530 may establish a communication session with wireless network 510 in order to receive communication service. Wireless network 510 may be a home (or primary, preferred, or high priority) network to wireless device 530. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 530 may establish a communication session with wireless network 550 in order to receive communication service. Wireless network 550 may be a roaming (or non-preferred, or low priority) network to wireless device 530. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 512 and access node 552 are network nodes capable of providing wireless communication to wireless device 530. Access node 512 and/or access node 552 can be, for example, a base transceiver station, a radio base station, an eNodeB device, or an enhanced eNodeB device. Access node 512 can communicate system information to wireless device 530. This system information may be communicated on a unicast (broadcast) paging channel. Access node 552 can communicate control channel traffic to wireless device 530 via wireless link 540. Access node 552 can communicate control channel traffic from wireless network 510 to wireless device 530 via wireless link 540.

In an embodiment, wireless device 530 may have, at first, a first active connection with wireless network 550 via wireless link 540. In other words, wireless link 540 is the primary communication path for wireless device 530 to receive communication service. Wireless network 550 can be a low priority network to wireless device 530.

Mobility node 516 may also receive, from wireless network 510, a first indicator that is associated with an availability of wireless network 510 to serve wireless device 530. Wireless network 510 can be a higher priority network than wireless network 550 is to wireless device 530. This first indicator may be associated with a load on access node 512. Mobility node 516 may receive this first indicator via a control channel message transmitted by access node 512.

Wireless device 530 can measure or receive a second indicator that is associated with a signal strength of access node 512. Wireless device 530 can send this second indicator to mobility node 516. In response to the first indicator and the second indicator, mobility node 516 can request that wireless network 550 (and access node 552, in particular) handover wireless device 530. For example, when mobility node 516 receives a load indicator that is lower than threshold $Th_{load}$, and determines that the second indicator is greater than threshold $Th_{signal}$, mobility node 516 may request that wireless device 530 be handed over to access node 512.

Wireless device 530 can establish a second active connection with wireless network 510. In other words, as part of the handover process, wireless device 530 can establish wireless link 546 as the primary communication path for wireless device 530 to receive communication service.

Figure 6:
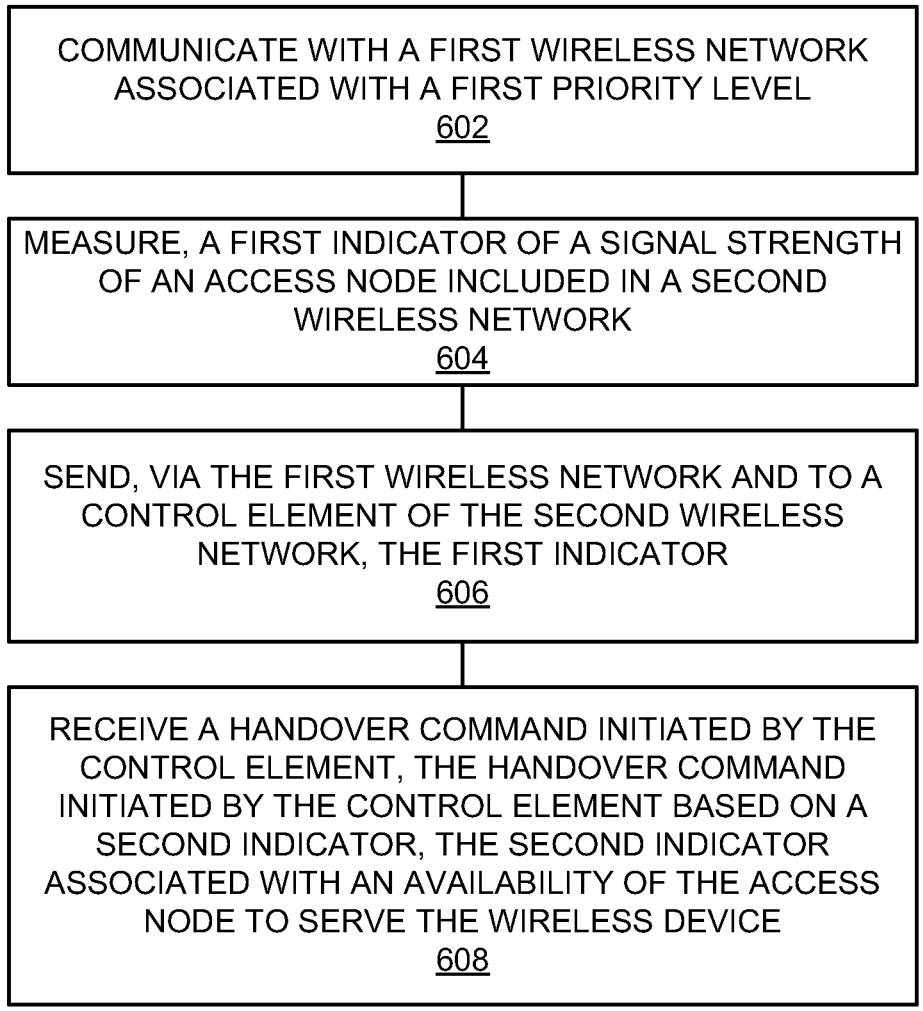
FIG. 6 is a flowchart illustrating an exemplary method for operating a wireless device.

FIG. 6 is a flowchart illustrating an exemplary method for operating a wireless device. The steps illustrated in FIG. 6 can be performed by elements of communication system 100, communication system 300, and/or communication system 500. A first wireless network associated with a first priority level is communicated with (602). For example, wireless device 530 may communicate with wireless network 550 using wireless link 540 as the primary communication path for wireless device 530 to receive communication service.

A first indicator of a signal strength of an access node included in a second wireless network is measured (604). For example, wireless device 530 may measure a signal strength associated with access node 512. The first indicator is sent via the first wireless network to a control element of the second wireless network (606). For example, wireless device 530 may send the measured indicator of signal strength associated with access node 512 to mobility node 516. Wireless device 530 may send the signal strength indicator using a control channel message that gets delivered via access node 552.

Based on a second indicator that is associated with an availability of the access node to serve the wireless device, a handover command initiated by the control element is received (608). For example, wireless device 530 may receive a handover command that was initiated by mobility element 516 based at least in part on the load on access node 512. The handover command may be further based on the measured signal strength associated with access node 512. For example, wireless device 530 may receive a handover command that was initiated in response to the indicator of access node 512's availability to serve wireless device 530 meeting a first threshold requirement (e.g., access node 512's load is below a threshold, or its free capacity is above a threshold) and the indicator of the measured signal strength of access node 512 meeting a second threshold requirement (e.g., the signal strength of access node 512, as measured by wireless device 530, is above a threshold.)

Figure 7:
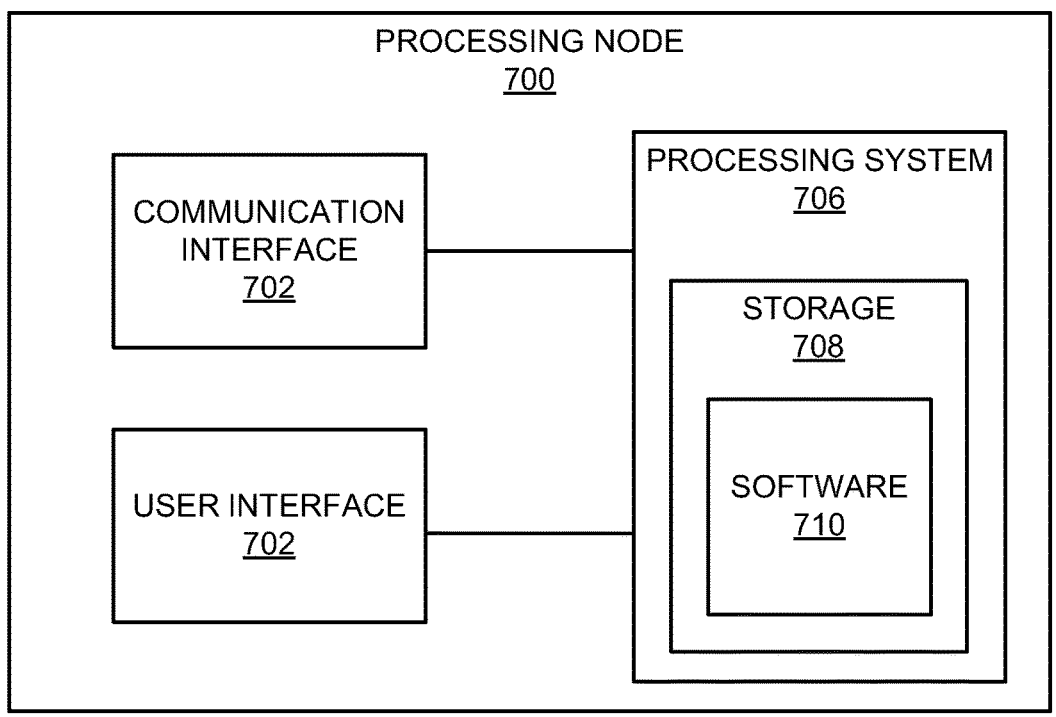
FIG. 7 illustrates a processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access node selection node 410. Processing node 700 can also be an adjunct or component of a network element, such as an element of access node 112, 152, 312, 352, 512 and/or 552, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    determining, by a control element of a target wireless communication network, that a wireless device is being served by a source wireless communication network;
    determining, by the target wireless communication network, that a base station of the target wireless communication network is available to serve the wireless device;
    deciding, by the control element of the target wireless communication network, that the wireless device should be handed over from the source wireless communication network to the target wireless communication network based on the determination that the target wireless communication network is available to serve the wireless device; and
    instructing, by the control element of the target wireless communication network, the source wireless communication network to handover the wireless device to the target wireless communication network based on the decision that the target wireless communication network is available to serve the wireless device.

2. The method of claim 1, further comprising:
    waiting a predetermined amount of time after the handover instruction; and,
    if the handover is not complete after the predetermined amount of time, retrying a handover of the wireless device from the source wireless communication network to the target wireless communication network.

3. The method of claim 1, further comprising:
    receiving, by the control element, an indicator associated with an availability of a base station of the target wireless communication network to serve the wireless device, wherein the indicator corresponds to a load on the base station.

4. The method of claim 3, wherein the control element instructs the source wireless communication network to handover the wireless device based on the indicator meeting a first threshold.

5. The method of claim 3, further comprising:
    requesting, from each of a plurality of base stations in the target wireless communication network, a respective indicator associated with the availability of each of the plurality of base stations to serve the wireless device.

6. A communication system, comprising:
    a control node comprising a processor of a target wireless communication network that determines a wireless device is being served by a source wireless communication network; and
    a base station of the target wireless communication network that determines the base stations is available to serve the wireless device, wherein the control node, in response to the determination that the target wireless communication network is available to serve the wireless device, decides that the wireless device should be handed over from the source wireless communication network to the target wireless communication network and instructs the source wireless communication network to handover the wireless device to the target wireless communication network.

7. The communication system of claim 6, wherein the control node waits a predetermined amount of time after the handover instruction and if the handover is not complete after the predetermined amount of time, retries the handover of the wireless device from the source wireless communication network to the target wireless communication network.

8. The communication system of claim 6, wherein the control node is further configured to:
    receive an indicator associated with an availability of the base station of the target wireless communication network to serve the wireless device, wherein the indicator corresponds to a load on the base station.

9. The communication system of claim 8, wherein the control node instructs the source wireless communication network to handover the wireless device based on the indicator meeting a first threshold.

10. The communication system of claim 6, wherein the control node requests, from each of a plurality of base stations in the target wireless communication network, a respective indicator associated with the availability of each of the plurality of base stations to serve the wireless device.

11. A method of operating a communication system, comprising:
- determining, by a target wireless communication network, that a first base station of the target wireless communication network is available to serve a wireless device, wherein the wireless device is in communication with a source wireless communication network;
- receiving, by a control node comprising a processor of the target wireless communication network, a first indicator associated with an availability of the first base station of the target wireless communication network to serve the wireless device;
- receiving, by the control node and via a second base station of the source wireless communication network, a second indicator, the second indicator associated with a signal strength of the first base station as measured by the wireless device; and
- based on the first indicator and the second indicator, deciding, by the control node of the target wireless communication network, that the wireless device should be handed over from the source wireless communication network to the target wireless communication network; and
- instructing, by the control node, the source wireless communication network to handover the wireless device to the target wireless communication network based on the decision that the target wireless communication network is available to serve the wireless device.

12. The method of claim 11, wherein the first indicator corresponds to a load on the first base station.

13. The method of claim 11, wherein the control node instructs the source wireless communication network to handover the wireless device based on the first indicator meeting a first threshold.

14. The method of claim 11, wherein the control node instructs the source wireless communication network to handover the wireless device based on the second indicator meeting a second threshold.

15. The method of claim 11, further comprising:
- requesting, from each of a plurality of base stations in the target wireless communication network, a respective indicator associated with the availability of each of the plurality of base stations to serve the wireless device.

16. The method of claim 1, wherein the target wireless communication network comprises a greater priority than the source wireless communication network.

17. The method of claim 16, wherein the control node instructs the source wireless communication network to handover the wireless device based on the priority for the target wireless communication network being greater than the priority for the source wireless communication network.

18. The method of claim 11, wherein the target wireless communication network comprises a greater priority than the source wireless communication network.

19. The method of claim 18, wherein the control node instructs the source wireless communication network to handover the wireless device based on the priority for the target wireless communication network being greater than the priority for the source wireless communication network.

20. The method of claim 1, wherein instructing, by the control node, the source wireless communication network to handover the wireless device to the target wireless communication network comprises sending a handover request to the source wireless communication network instructing the source wireless communication network to handover the wireless device to the target wireless communication network.

* * * * *